Dec. 10, 1957  D. M. JACKSON  2,815,973
DYNAMIC SEAL
Filed July 5, 1955
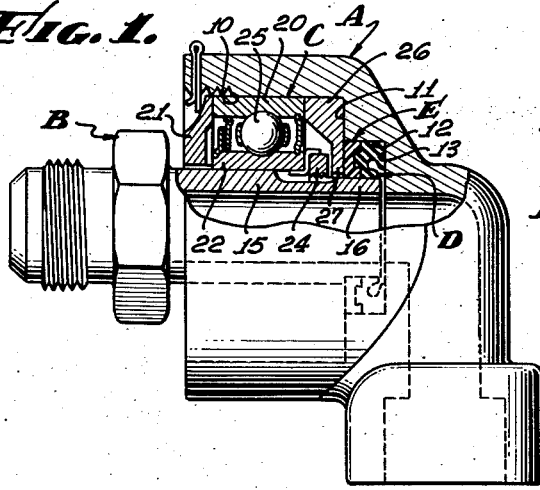
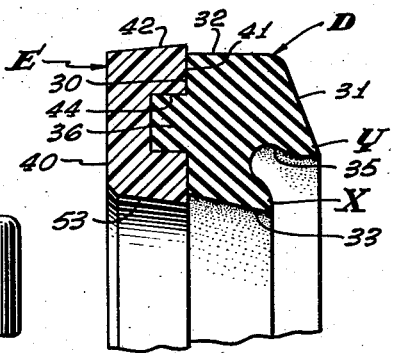
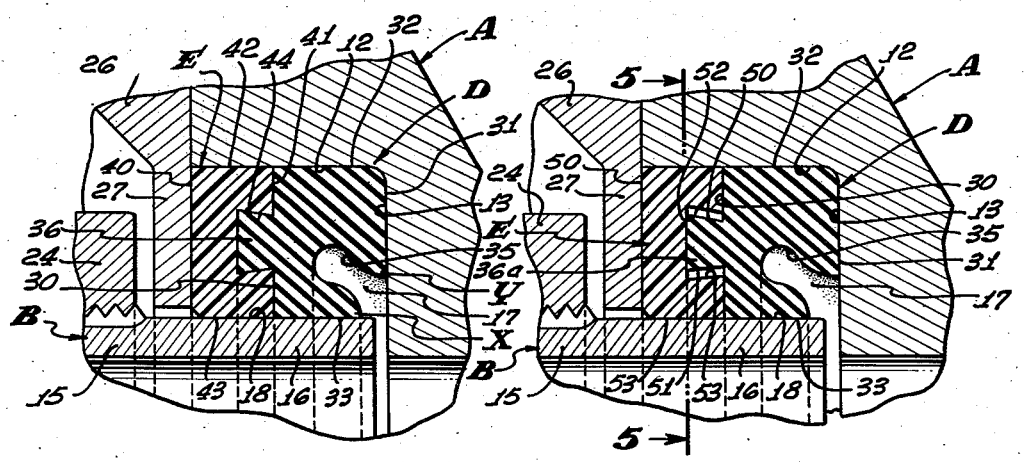
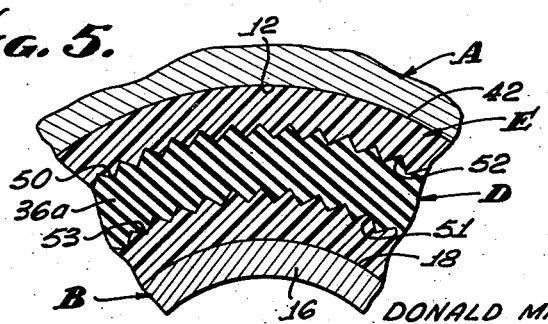
INVENTOR.
DONALD MANNING JACKSON
BY
*Maxwell & Maxwell*
AGENTS.

United States Patent Office 2,815,973
Patented Dec. 10, 1957

2,815,973

DYNAMIC SEAL

Donald M. Jackson, Fullerton, Calif., assignor to Chicksan Company, Brea, Calif., a corporation of California Application July 5, 1955, Serial No. 519,902

2 Claims. (Cl. 288—5)

This invention has to do with a seal applicable to a fluid handling swivel joint, or the like, and it is a general object of the invention to provide a simple, practical, improved seal adapted to handle fluid under high pressure.

Rubber and other soft resilient rubber-like materials have certain characteristics which make them highly desirable for use in fluid seals or packings, while at the same time, have certain other characteristics which make them impractical for such structures, or materially limit their application for such use. Rubber, or rubber-like materials, that are soft, flexible and resilient, when employed as fluid seals, can be made to shift and conform to the surfaces with which they make contact, to establish fluid tight sealing engagement therewith. Seals formed of such materials can be made to establish sealing engagement with sealing surfaces by the application of mechanical, or fluid pressure, or both. The resilient characteristic of rubber, or the like, is highly significant when such material is employed to establish a seal, since the seal will return to its original configuration when the mechanical and/or fluid pressures acting upon it are relaxed or released, and with the result that it will be in proper configuration and/or form, when the pressures are again exerted upon it, to receive the load and re-establish proper sealing engagement. The undesirable characteristics of rubber, or the like, when employed as a fluid seal, is the tendency for the seal to flow and extrude through the openings or spaces occurring in the structure with which it is related when it is acted upon by high pressures.

It has been found that when rubber seals are formed of sufficiently hard rubber to resist extrusion, their softness and flexibility, which are their most desirable characteristics, are altered to a degree that renders the seals ineffective.

Attempts have been made to provide means to prevent sealing rings formed of soft, resilient rubber, or rubber-like materials, from extruding between the parts of the structure with which they are related, but with little or no success. Such attempts have included the application of rigid, non-extruding backing members for the seals, and/or supplementing the seals with metal shields or jackets. In each attempt to provide an anti-extrusion means for a rubber seal, a rigid, non-extruding, or extrusion resistant material has been employed to back up the seal. Due to the rigid nature of such means it has been necessary to provide running or working clearance between the said means and sealing surfaces of the structure with which the seals are related, and with the result that spaces and/or openings occur between the said means and the sealing surface, and through which the seals extrude.

Several so-called plastic materials, for instance, tetrafluoroethylene, commonly referred to as "Teflon," have certain characteristics which make them highly desirable in seals and packings, while at the same time have characteristics which make them impractical for such use.

The general type of plastic material referred to above, and which will be hereinafter termed Teflon, is flexible and is somewhat soft, but unlike rubber, is highly resistant to flowing and/or extrusion. The above characteristics of Teflon make it highly desirable for use as a fluid seal, and especially in situations where high pressures and the problem of the seal extruding are encountered. Teflon, being resistant to flowing and extrusion, does not establish as effective seal as rubber, unless considerable force is exerted thereon, since it tends to resist conforming to irregularities on or in the surfaces upon which it is engaged. Another desirable characteristic of Teflon is its extremely low coefficient of friction, which makes it possible to engage seals formed of such material upon relatively movable sealing surfaces with considerable force or pressure and without creating excessive frictional drag therebetween. Teflon is, however, practically without resiliency and, therefore, is generally not recognized or considered useful or practical in seals or packing, particularly in seals or packings for swivel joints, or the like, since it will not return, by itself, to its initial configuration, in the manner set forth above in considering the desirable, resilient characteristics and use of rubber as a sealing material.

It is a general object of this invention to provide a dynamic seal having a soft, resilient sealing ring formed of rubber and a flexible anti-extrusion ring formed of Teflon, cooperatively related to combine the desirable sealing characteristics of both of said materials.

A further object of this invention is to provide a seal of the general character referred to wherein the Teflon ring is interengaged with the rubber ring and so that the rubber ring normally yieldingly urges the non-resilient Teflon ring into sealing engagement with the parts of the joint with which the seal is engaged and prevents the rubber ring from extruding therebetween.

Another object of the present invention is to provide a seal of the character referred to wherein the anti-extrusion Teflon ring and rubber sealing ring are actuated into pressure sealing engagement when the seal is initially engaged in the structure to which it is related and which are further urged into sealing engagement with the parts of the structure, upon the application of fluid pressure thereon.

It has been found that sealing rings formed of soft, resilient material and having fluid pressure actuated sealing lips tend to shift and flow along the surfaces upon which they are urged into engagement.

It is an object of the present invention to provide a seal of the character referred to having a soft, resilient rubber sealing ring with a pair of annular fluid pressure actuated lips, one adapted to seal on a straight annular surface concentric with the longitudinal axis of the seal and the other adapted to seal on a flat surface which is normal to the longitudinal axis of the seal. Another object is to provide a seal of the character referred to wherein one of the sealing lips seals on one of the surfaces which is engaged by the anti-extrusion ring and is prevented from flowing or extruding therealong by the backing ring, and the other sealing lip, sealing on a surface spaced from the anti-extrusion ring and normal to the surfaces engaged by the anti-extrusion ring, with the result that it is not subject to flowing or extruding past the anti-extrusion ring and between the parts of the structure in which the seal is engaged.

A further object of the invention is to provide a Teflon anti-extrusion ring which, when engaged in a structure, clamps a part on the rubber sealing ring so that the sealing ring will not rotate relative to the backing ring in a manner that would tear, burn or otherwise damage one or both of the said rings.

The various objects and features of my invention will be fully understood from the following detailed description of typical preferred forms and applications of my invention, throughout which description reference is made to the accompanying drawings, in which:

Fig. 1 is a side elevational view of a typical swivel joint construction and showing a part of the joint in section to illustrate details of the construction and show the seal provided by the present invention engaged therein. Fig. 2 is an enlarged longitudinal sectional view of a portion of the seal that I provide and showing the seal in free form. Fig. 3 is an enlarged detailed sectional view of a portion of the joint construction illustrated in Fig. 1 and showing my seal engaged therein. Fig. 4 is a view similar to Fig. 3 and showing a slightly different form of the invention engaged in the joint construction, and Fig. 5 is a view of the seal shown in Fig. 4 and taken substantially as indicated by line 5—5 on Fig. 4.

The seal provided by the present invention is applicable to a fluid handling swivel joint or other like fluid handling structures involving swivel connections.

In Figs. 1, 3 and 4 of the drawings, I have illustrated a simple, fluid handling swivel joint construction in which the seal provided by the present invention can be advantageously engaged.

The seal as provided by the present invention, is adapted to be embodied or incorporated in various joint constructions, for instance, it may be applied to or incorporated in a swivel joint construction such as is illustrated in Figs. 1, 3 and 4 of the drawings. The particular joint construction illustrated in the drawings is made up of two main sections A and B, and between which the seal provided by the present invention is engaged. In the particular case illustrated, the joint section A has a socket 10 entering it from one end, which socket terminates at a bottom 11, while a counterbore 12 of reduced diameter continues inward from the bottom 11 and terminates at a flat bottom 13. The section B is a male section having a pin portion 15 extending into the socket 10. The pin portion 15 has an end or extension 16 that extends into the counterbore with clearance and establishes an annular chamber 17 between the joint sections A and B and concentric therewith. The extension 16 has a smooth, cylindrical exterior wall 18 around which the seal is adapted to be engaged and seal with.

In the particular case illustrated, a suitable anti-friction bearing means C rotatably connects and supports the pin portion 15 of the section B in the socket 10. In the particular case illustrated, the bearing means D includes an outer race 20 held in the socket 10 by a threaded retainer 21, an inner race 22, held on the pin portion 15 of the section B by a threaded retainer 24, and an annular series of balls 25 between the races.

In the particular case illustrated, an insert 26 is engaged in the socket 10 inward of the bearing means C and this insert seats against the bottom 11 of the socket and has an inwardly projecting portion 27 which, in effect, forms a closure for the annular chamber 17 established in the structure as hereinabove described. The insert 26 may be considered a part of the section A and may be held or clamped rigidly therein by the retainer 21, acting through the outer race 20 of the bearing means C, as will be apparent from a consideration of Fig. 1 of the drawings.

The seal provided by the present invention is carried in or confined to the annular chamber 17 and includes, generally, a sealing ring D of soft, resilient rubber, or rubber-like material, and an antiextrusion ring E formed of flexible extrusion resistant material such as Teflon, or the like. In the particular case illustrated, the rings D and E of the seal are combined or related to each other and with the joint construction so that when they are confined in the chamber 17 of the joint, they are compressed together radially of the joint construction, and so that the resilient sealing ring D acts upon the antiextrusion ring D to press and urge it radially inwardly and outwardly and into tight sealing engagement with the parts of the joint construction.

The sealing ring D provided by this invention has a front face 30, a rear or back face 31, an outer peripheral face 32 and an inner peripheral face 33. The front face 30 is preferably a flat face which is normal to the axis of the seal and corresponds with the chamber 17 in radial extent, so that when the sealing ring is placed in the chamber 17, it extends from the exterior 18 of the pin extension 16 to the cylindrical wall of the counterbore 12. The outer peripheral face 32 of the ring D is preferably a straight, longitudinally disposed face that extends between and joins the rear and front faces 30 and 31 and is adapted to occur adjacent and bear against the side wall of the counterbore 12. The inner wall 33 of the sealing ring D, when the ring is free, as shown in Fig. 2 of the drawings, extends axially from the front face 30 and diverges and terminates short of the back face 31 of the ring. The exterior wall 18 of the extension 16 is parallel with the wall of the counterbore 12 and when the sealing ring D is confined between these parts of the swivel joint construction, the sealing ring is compressed radially, so that the inner and outer faces 33 and 32 are urged into parallel relationship with each other and into tight, sealing engagement with said wall of the counterbore and the exterior of the pin extension.

The back face 31 of the sealing ring D joins the outer peripheral face 32 and projects substantially radially inwardly therefrom and terminates short of the inner circumference of the ring D, and when the seal is free, as illustrated in Fig. 2 of the drawings, is radially inwardly divergent. When the ring D is in operating position, or is confined between the joint parts, the back face 31 engages the bottom 13 of the counterbore 12 and is urged or compressed into the counterbore 12 so that the said back face establishes tight, flat sealing engagement with the bottom 13 of the counterbore, as clearly illustrated in Figs. 1, 3 and 4 of the drawings.

The sealing ring D is further provided with an annular cavity 35 extending diagonally into the ring from between the rearmost edge of the inner peripheral face 33 and the inner peripheral edge of the back face 31. The cavity 35 extends a substantial distance into the ring and terminates in the ring at a rounded bottom. The cavity 35 is arranged in the ring C so that its inner portion occurs radially outward of the rearmost portion of the inner peripheral face 33 and axially forward of the inner peripheral portion of the back face 31 of the sealing ring. With the above relationship of parts, it will be seen that the cavity 35 establishes a longitudinally disposed rearwardly projecting sealing lip X, which lip engages the exterior 18 of the pin extension 16, and establishes a radially disposed, radially inwardly projecting sealing lip Y, which lip engages the bottom 13 of the counterbore 12. It will also be apparent that the cavity 35, occurring in the inner rear corner of the ring, is in open communication with the space that occurs between the inner terminal end of the pin extension 16 and the bottom wall 13 of the counterbore 12, and receives fluid from within the joint construction, which fluid, when under pressure, acts upon the sealing lips X and Y established by the cavity to urge and maintain the lips in tight sealing engagement with the joint parts.

The sealing ring D is further provided with an annular pressure rib 36, which rib projects longitudinally forward from the front face 30 of the sealing ring, and is arranged on the said front face to occur between the inner and outer peripheral faces of the ring. The rib 36 is rectangular in cross sectional configuration and is adapted to be engaged by and to actuate the anti-extrusion ring E when the seal is engaged in working position in the joint construction.

The anti-extrusion ring E provided by the present invention, is carried in and confined to the annular chamber 17 of the joint construction to occur between the front face 30 of the sealing ring D and the flange 27 of the insert 26, which closes the counterbore 12. The anti-extrusion ring E has a front face 40, a rear or back face 41, an outer peripheral face 42 and an inner peripheral face 43. The front or forward face 40 of the anti-extrusion ring, is a flat, radially disposed face and corresponds in radial extent with the annular chamber 17, so that when the ring E is placed in the chamber 17 it extends from the exterior 18 of the pin extension 16, to the cylindrical wall of the counterbore 12, and bears against the flange 27 of the insert 26. The inner and outer peripheral faces 43 and 42 of the ring E, when the ring is free, as shown in Fig. 2 of the drawings, extend axially from the forward face 40 and diverge, as clearly illustrated in Fig. 2 of the drawings. When the anti-extrusion ring E is in operating position, that is, when the ring is confined between the exterior wall 18 of the pin extension 16 and the cylindrical wall of the counterbore 12, the ring is compressed radially, so that the faces 42 and 43 are parallel with each other and with the said parts of the joint construction, as clearly illustrated in Figs. 3 and 4 of the drawings.

The rear or back face 41 of the anti-extrusion ring E establishes flat, butting engagement with the forward end face of the sealing ring D and is provided with an annular groove 44, which groove is rectangular in cross sectional configuration. When the seal is free, the groove 44 slidably receives the pressure rib 36 on the sealing ring D, as clearly illustrated in Fig. 2 of the drawings. When the seal is engaged in the chamber 17 of the joint construction, in the manner described above, it will be seen that the anti-extrusion ring E, being compressed, compresses the pressure ring 36 on the ring D. It will also be apparent that the pressure rib 36 being formed of resilient material, and being compressed normally yieldingly acts on the ring E to urge the peripheral faces 42 and 43 thereof, apart and into tight sealing engagement with the wall of the socket 10 and the exterior wall 18 of the pin extension 16.

When the seal that I provide, is assembled and arranged in working position in the joint construction illustrated, and in the manner described above, it will be seen that the anti-extrusion ring E, is engaged by the flange 27 of the insert 26 and holds the sealing ring D pressed against the bottom wall 13 of the socket 12, and so that the back face 41 of the sealing ring establishes flat pressure sealing engagement with the bottom of the socket. It will also be apparent that the sealing ring D being formed of resilient material and being compressed between the bottom wall 13 of the socket and the back face 41 of the anti-extrusion ring E, in the manner described, serves to urge the front face 30 of the ring D tight against the back face of the ring E and maintain the pressure rib 36 on the ring D engaged in the groove 44 in the ring E.

When the seal, provided by the present invention, is in operation, and fluid is being handled at low pressures, the sealing ring being engaged in the annular chamber 17 of the joint in a slightly compressed condition, serves to prevent the passage of fluid outwardly between the joint parts. When fluid is being handled in the joint construction at high pressures it enters the cavity 35 in the sealing ring D and urges the sealing lips X and Y into tight sealing engagement with the exterior 18 of the pin extension 16 and with the bottom 13 of the counterbore 12. The fluid pressure acting upon the sealing lip X tends to shift or cause that lip and the portions of the sealing ring D adjacent to it, to flow along the exterior wall 18 of the extension 16, towards the anti-extrusion ring E, which ring being resistant to flow or extrusion and being urged into tight sealing engagement with the exterior wall 18 of the extension 16 by the pressure rib 36 on the sealing ring D, stops the flow of the sealing ring along the extension and prevents extrusion of the sealing ring between the anti-extrusion ring and the extension. The fluid pressure acting upon the sealing lip Y of the sealing ring C tends to shift or cause that sealing lip and the adjacent portion of the sealing ring to flow radially outward across the bottom wall 13 of the counterbore 12, but since there is no passage or opening between the bottom 13 and the side wall of the counterbore 12, through which the sealing ring might extrude, the problem of extrusion is eliminated and means to prevent extrusion of that sealing lip and portion of the sealing ring D is not required.

It will be further noted that the anti-extrusion ring E clamps the pressure rib 36 on the sealing ring D when the seal is confined in the chamber 17, so that the sealing and anti-extrusion ring D and E will not rotate or slip relative to each other and in a manner that might cause damage to one or both of the rings.

In Fig. 4 of the drawings, I have shown a slightly modified form of the present invention, wherein the inner and outer peripheral walls 50 and 51 of the pressure rib 36ª on the sealing ring D and the inner and outer peripheral walls 52 and 53 of the groove 44 in the anti-extrusion ring E are serrated so that when the rings D and E are engaged with each other, the serration on the ring 36 and in the groove 44 mesh with each other and to hold the sections together and positively prevent relative rotation of the rings.

From the foregoing it will be apparent that I have provided a seal construction which possesses and utilizes all of the advantages and desirable characteristics of a simple, soft rubber, fluid pressure actuated seal, and at the same time, overcomes and compensates for the undesirable characteristics of rubber for use as a seal. It will also be apparent that I have provided a seal construction which possesses and utilizes all of the advantages and desirable characteristics of a seal formed of Teflon and at the same time, overcomes and compensates the undesirable characteristics of Teflon for use in a seal.

It will also be apparent that I have provided a fluid pressure actuated seal adapted to establish sealing engagement on sealing surfaces that are arranged at right angles to each other, and a seal of the character referred to which receives the fluid pressure load in such a manner that the forces are transferred to the joint construction in two planes, at right angles to each other so that only one portion of the seal is acted upon by the fluid pressure in a manner that could cause extrusion.

Having described only typical preferred forms and applications of my invention, I do not wish to be limited or restricted to the specific details herein set forth, but wish to reserve to myself any variations or modifications that may appear to those skilled in the art and fall within the scope of the following claims.

Having described by invention, I claim:

1. An annular seal including, an anti-extrusion ring of flexible extrusion resistant material with a flat radially disposed back face and rearwardly diverging peripheral faces, said back face having an annular channel therein, and a sealing ring of soft resilient material with a flat, radially disposed front face and an annular rib projecting from the front face into the channel in the anti-extrusion ring, said faces of the anti-extrusion ring and the sealing ring being in face-to-face abutment to limit projection of the rib into the channel, the seal being adapted to be engaged in an annular packing chamber in a fluid handling structure with said peripheral faces squeezed into parallel relation to subject the rib to radial compression in the channel and with the rib acting on the anti-extrusion ring to normally yieldingly urge it radially into tight sealing engagement in the chamber.

2. An annular seal including, an anti-extrusion ring of flexible extrusion resistant material with flat radially disposed front and back faces and rearwardly diverging inner and outer peripheral faces extending rearwardly therefrom, said back face having an annular channel therein, and a sealing ring of soft resilient material with a flat, radially disposed front face, and inner and outer peripheral faces extending rearwardly therefrom, and an annular rib projecting from the front face of the sealing ring into the channel in the anti-extrusion ring, the back face of the anti-extrusion ring and the front face of the seal ring being in face-to-face abutment to limit projection of the rib into the channel, the seal being adapted to be engaged in an annular packing chamber in a fluid handling structure with the anti-extrusion ring in radial compression and compressing the rib in the channel with the rib acting on the anti-extrusion ring to normally yieldingly urge it radially into tight sealing engagement in the chamber, the annular channel in the extrusion resistant ring and the rib on the sealing ring having interengaged serrated surfaces to prevent relative rotation of the said rings.

References Cited in the file of this patent

UNITED STATES PATENTS

| | | |
|---|---|---|
| 2,081,040 | King | May 18, 1937 |
| 2,387,182 | Proctor | Oct. 16, 1945 |
| 2,459,981 | Warren | Jan. 25, 1949 |
| 2,705,177 | Waring | Mar. 29, 1955 |
| 2,723,136 | Deubler | Nov. 18, 1955 |